United States Patent Office 3,287,287
Patented Nov. 22, 1966

3,287,287
EXPANDABLE, CROSS-LINKABLE POLY
(EPIHALOHYDRIN) COMPOSITION
William D. Willis, Wilmington, Del., assignor to Hercules
Incorporated, a corporation of Delaware
No Drawing. Filed Jan. 31, 1964, Ser. No. 341,728
13 Claims. (Cl. 260—2.5)

This application is a continuation-in-part of my copending application, Serial No. 261,189, filed February 26, 1963, now abandoned.

This invention relates to cross-linking epihalohydrin polymers and copolymers, to expandable, cross-linkable poly(epihalohydrin) compositions and stable cross-linked poly(epihalohydrin) cellular products made therefrom.

Epihalohydrin polymers and copolymers are comparatively new and possess a combination of properties which make them attractive for use in a diversity of applications. For example, in addition to having generally good overall physical properties, they have excellent swelling resistance in solvents and are outstanding in aging resistance, including outdoor exposure, ozone exposure and heat aging in air up to temperatures of at least 300° F.

It is known that high molecular weight polymers and copolymers of epihalohydrins can be vulcanized, i.e., cross-linked with various aliphatic and heterocyclic polyamines to produce rubbers that have the good attributes of a number of the so-called specialty rubbers and hence may be used as what might be termed a general purpose specialty rubber. In using these polyfunctional polyamine cross-linking agents, however, great care must be exercised to avoid scorching during the vulcanization of the polymer. Moreover, heretofore the polymers and copolymers of epihalohydrins have not been utilized for the preparation of stable expanded materials, although the combination of properties of poly(epihalohydrin) makes it attractive for such use.

It is an object of this invention, therefore, to provide an improved method of cross-linking polymers and copolymers of epihalohydrins which largely overcomes the scorching tendency during the curing of the polymer.

It is another object of this invention to provide stable, cross-linked poly(epihalohydrin) cellular products.

It is a further object of this invention to provide expandable, curable poly(epihalohydrin) compositions from which stable, cross-linked poly(epihalohydrin) cellular products can be made. Other objects will be apparent from the detailed description that follows.

Now, in accordance with this invention, it has been found that any high molecular weight polymer or copolymer of epihalohydrin can be vulcanized, i.e., cross-linked, by heating the same in a confined space under pressure in the presence of a heat decomposable ammonium salt at a temperature above the decomposition temperature of said ammonium salt.

In the process of this invention it has been found that the ammonium salt decomposes to release ammonia, and cross-linking is effected by chemical reaction of the ammonia with the poly(epihalohydrin). This was most surprising, since it could not have been foreseen that the ammonium salt would lead to cross-linking, particularly since it is known that aliphatic primary monoamines alone are not cross-linking agents for polymers of epihalohydrins. Moreover, there is an economic advantage in employing heat decomposable ammonium salts as cross-linking agents over the polyfunctional polyamines, since many ammonium salts are comparatively low priced chemicals, and furthermore, poly(epihalohydrin) compositions containing a heat decomposable ammonium salt are very resistant to scorch during the cross-linking operation, and the resulting cross-linked compositions are substantially odorless.

For the preparation of uniformly dense, cross-linked products, substantially free of porosity, in accordance with this invention, an epihalohydrin polymer or copolymer is initially blended with a heat decomposable ammonium salt at a temperature below the decomposition temperature of said ammonium salt, and the resulting blend of polymer or copolymer and decomposable ammonium salt is then heated in a confined space under pressure at a temperature above the decomposition temperature of said ammonium salt until the cross-linking reaction is substantially complete.

For the preparation of stable, cross-linked, cellular poly(epihalohydrin) products in accordance with this invention, an epihalohydrin polymer or copolymer is initially blended with a heat decomposable ammonium salt, with or without a conventional blowing agent as necessary or desired, at a temperature below the decomposition temperature of said ammonium salt and said blowing agent when present, and the resulting blend is then subjected to a pressure cure of short duration in a confined space at a temperature above the decomposition temperature of said ammonium salt and of said blowing agent when present, to effect at least partial cross-linking and expansion of the polymer. Thereafter pressure is released and the resulting partially cross-linked, expanded polymer is subjected to a post-cure to complete the cross-linking of said polymer.

It has been found that ammonium salts such as ammonium carbonate, ammonium bicarbonate, ammonium carbamate, and mixtures thereof in any proportion, decompose upon heating to release both ammonia and carbon dioxide, and therefore combine the functions both of cross-linking agents and of blowing agents. When such ammonium salts are employed in this invention, cross-linked, expanded poly(epihalohydrin) products can be prepared without the use of any auxiliary conventional blowing agent. However, an auxiliary blowing agent may be employed, if desired. On the other hand, ammonium salts such as ammonium acetate, ammonium arsenate, ammonium borate, and the like function only as cross-linking agents, and require employment of a conventional blowing agent in order to prepare cross-linked expanded poly(epihalohydrin) products in accordance with this invention.

The cross-linked poly(epihalohydrin) expanded products of this invention are stable, closed cell materials, being either spongelike or rigid, depending on whether elastomeric or crystalline polymer is used. In general, they will have densities within the range from about 8 pounds per cubic foot to about 80 pounds per cubic foot, and retain all of the characteristic desirable properties of the basic poly(epihalohydrin)s from which they are formed, including, in addition to good over-all physical and mechanical properties, excellent swelling resistance to solvents, and outstanding aging resistance, including outdoor exposure, ozone exposure, and heat aging up to temperatures of at least 300° F.

In practicing this invention, it is both convenient and practical to work the desired amount of ammonium salt into a poly(epihalohydrin) on a differential two-roll mill, or in a Banbury mixer, or other equivalent malaxating equipment at any convenient temperature below the decomposition temperature of the ammonium salt. Similarly, any desired conventional compounding ingredients such as pigments, extenders, fillers, flame-proofing agents, plasticizers, antioxidants, stabilizers, anti-sticking agents, lubricating agents, blowing agents, etc., in any desired amounts are also blended into the polymer on the two-roll mill, or equivalent malaxating equipment.

For the production of uniformly dense, cross-linked products, substantially free of porosity, the resulting blend of epihalohydrin polymer or copolymer and ammonium salt, with or without desired conventional compounding ingredients, is then heated in a confined space under pressure at a temperature above the decomposition of the ammonium salt until the cross-linking reaction is substantially complete. This pressure cure is ordinarily carried out in a closed mold of the desired configuration under pressure at temperatures from about 280° F. to about 375° F., preferably from about 300° F. to about 325° F., at pressures between about 250 pounds per square inch and about 2,000 pounds per square inch, preferably between about 400 pounds per square inch and about 900 pounds per square inch and for a period of time between about 15 minutes and about 2 hours, preferably between about 30 minutes and about 45 minutes, sufficient to complete the cross-linking reaction.

For the production of cross-linked, blown products, the blend of epihalohydrin polymer and ammonium salt, with or without a conventional blowing agent, and with or without conventional compounding ingredients, is subjected to a pressure cure of short duration above the decomposition of the ammonium salt and of conventional blowing agent (when used) to effect at least partial cross-linking and expansion of the polymer. This pressure cure of short duration is ordinarily carried out in a closed mold of the desired configuration under pressure at temperatures from about 280° F. to about 375° F., preferably from about 300° F. to about 325° F., for a short time interval within the range from about 2 minutes to about 10 minutes, preferably from about 3 minutes to about 5 minutes, at pressures between about 250 pounds per square inch and about 2,000 pounds per square inch, preferably between about 400 pounds per square inch and about 900 pounds per square inch.

During this pressure cure of short duration, substantially all of the blowing of the polymer takes place, as well as a major part of the cross-linking of the polymer, at least sufficient to stabilize the closed-cell structure of the blown polymer and prevent rupture of said closed-cell structure upon release of pressure.

Following the pressure cure of short duration, pressure is released, and the partially cross-linked, blown polymer is then subjected to a post-curing operation at atmospheric pressure to complete the cross-linking. It has been observed that in the case of elastomeric polymers the elastic properties of post-cured blown elastomeric compositions of this invention are usually improved over the elastic properties of the blown compositions prior to post-curing.

Temperatures employed during the post-curing are generally on the order of about 280° F. to about 350° F., preferably about 290° F. to about 310° F., and the duration of the post-curing operation may vary from about 10 minutes to about 1 hour, preferably from about 10 minutes to about 30 minutes. Post-curing of the blown compositions may be accomplished by any convenient means, such as, for example, conventional hot air or hot gas ovens or tunnels, radiant heat sources, such as infrared lamps or incandescent heating elements, etc.

Any high molecular weight polymer of an epihalohydrin, including amorphous, crystalline, isotactic, etc. polymers of epihalohydrin, is suitable for the purposes of this invention. Such polymers may be homopolymers prepared by polymerizing any monomeric epihalohydrin, e.g., epifluorohydrin, epichlorohydrin, epibromohydrin, or epiiodohydrin. They may also be copolymers in which the repeating units are derived from mixtures in any proportion of two or more molecular species of monomeric epihalohydrins, such for example as mixtures of epichlorohydrin and epibromohydrin, or mixtures of epibromohydrin, epifluorohydrin, and epiiodohydrin. They may also be copolymers of epihalohydrins with one or more other epoxides in which a major amount of the repeating units, e.g., at least about 50% by weight, are derived from epihalohydrins, such as, for example, a copolymer of propylene oxide and epichlorohydrin. The polymer may be essentially wholly amorphous, a mixture of amorphous and crystalline polymers, or essentially completely crystalline. Generally, the amorphous polymers provide the most rubbery products. However, excellent rubbery products are obtained from expandable compositions of mixtures of amorphous and crystalline polymers. In this case, the amount of the crystalline polymer is generally less than about 25% to 30% by weight of the mixture.

The epihalohydrin polymers of this invention are essentially linear polyethers in which polymerization, at least in major part, has taken place through the epoxide linkage so that the polymer contains halomethyl groups attached to the main polymer chain. The homopolymers are believed to have the following general formula:

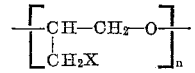

in which X is halogen and $n$ is a numeral designating the number of repeating units in the polymer. In the same way, when an epihalohydrin is copolymerized with one or more other epoxides (including other epihalohydrins) polymerization takes place through the epoxide linkage even though other polymerizable groups may be present, and it is apparent that such copolymers also contain halomethyl groups attached to the main polymer chain.

Typical of other epoxides that can be copolymerized with epihalohydrins to produce the polymers used in this invention include, by way of example, the alkylene oxides such as ethylene oxide, propylene oxide, butene-1 oxide, cis and trans butene-2 oxides, hexene-1 oxide, hexene-2 oxide, dodecene-1 oxide, isobutylene epoxide, and the like; cycloaliphatic epoxides such as cyclohexene oxides, vinyl cyclohexene oxides (both mono- and dioxides), α-pinene epoxide, dipentene epoxide, and the like; epoxy ethers such as ethyl glycidyl ether, isopropyl glycidyl ether, tert-butyl glycidyl ether, phenyl glycidyl ether, chlorophenyl glycidyl ether, 2-chloroethyl glycidyl ether, ethylphenyl glycidyl ether, vinyl glycidyl ether, allyl glycidyl ether, methallyl glycidyl ether, vinyl cyclohexyl glycidyl ether, o-allylphenyl glycidyl ether, p-vinylbenzyl glycidyl ether, and the like; ethylenically unsaturated glycidyl esters such as glycidyl crotonate, glycidyl oleate, glycidyl methacrylate, and the like; and other epoxides such as, for example, styrene oxide, α-methylstyrene oxide, butadiene monoxide, butadiene dioxide, epoxy stearates, 3,4-epoxy-1-pentene, 3,4-epoxy-1-vinylcyclohexene, divinyl benzyl monoxide, and the like The epihalohydrin polymers used in this invention are characterized by having a weight average molecular weight of at least about 40,000 and preferably at least about 100,000. Molecular weights of this order usually correspond to reduced specific viscosity, $\eta_{sp}/C$, of at least about 0.2 and preferably at least about 0.5. Reduced specific viscosities are generally determined on solutions of the polymers at 0.1% concentration in α-chloronaphthalene at 100° C., although polymers high in epifluorohydrin content are preferably determined on solutions thereof at 0.1% concentration in cyclohexanone at 50° C.

In the expression $\eta_{sp}/C$ for defining reduced specific viscosity, the symbol $\eta_{sp}$ stands for specific viscosity and the symbol C stands for concentration of the polymer in the solution thereof in solvent expressed as grams per 100 ml. of solution. Specific viscosity, $\eta_{sp}$, is obtained by dividing the difference between the viscosity of the polymer solution and the viscosity of the solvent used therein by the viscosity of the solvent.

The epihalohydrin polymers used in this invention can be prepared by contacting an epihalohydrin monomer, a mixture of epihalohydrin monomers, or a mixture of one or more epihalohydrin monomers and one or more other epoxide monomers with a catalyst formed by reacting an organoaluminum compound with from about 0.1 mole to about 1.5 moles of water per mole of organoaluminum compound. They may also be prepared by contacting a monomeric epihalohydrin, a mixture of monomeric epihalohydrins, or a mixture of one or more monomeric epihalohydrins and one or more other monomeric epoxides with a catalyst formed by reacting an organoaluminum compound with from about 0.01 mole to about 2 moles of a chelating agent such as acetylacetone, benzoylacetone, acetoacetic acid, ethyl glycolate, oxalic acid, glyoxal monoxime, etc., and with from about 0.1 mole to about 1.5 moles of water per mole of organoaluminum compound. Exemplary of organoaluminum compounds that can be so reacted with chelating agent and/or with water and used as the catalyst are triethylaluminum, triisobutylaluminum, diethylaluminum hydride, etc. The amount of such catalyst will generally be in the range from about 0.2 to about 10 mole percent based on the weight of monomers being polymerized, preferably from about 1 to about 5 mole percent.

The polymerization reaction is generally carried out in the presence of an inert, liquid, organic diluent, but can be carried out in an essentially bulk polymerization process. Suitable diluents that can be used for the polymerization are the ethers, hydrocarbons, halogenated hydrocarbons, and mixtures of such diluents. The temperature of the polymerization process can be varied over a wide range, generally from about −80° C. to about 250° C., and while atmospheric pressure is usually used, the pressure can be varied from subatmospheric up to several atmospheres.

As an auxiliary, or in other cases as a necessary, blowing agent in the expandable, curable poly(epihalohydrin) compositions of this invention there can be used any of the well-known chemical blowing agents as, for example, azo bis(formamide), diazaminobenzene, N,N'-dinitrosopentamethylene tetramine, N,N'-dimethyl-N,N'-dinitrosoterephthalamide, p,p'-oxy-bis(benzene sulfonyl semicarbazide), azo bis(isobutyronitrile), p,p'-oxy-bis(benzene sulfonyl hydrazide), p,p'-diphenyl-bis(sulfonyl hydrazide), benzene-sulfonyl hydrazide, m-benzene-bis(sulfonyl hydrazide), etc. The well-known solvent blowing agents such as butane, hexane, chloroform, trichloroethylene, monochlorotrifluoromethane, monochlorodifluoromethane, dichlorotetrafluoroethylene, etc., can also be used. In short, any compound which decomposes to yield at least one mole of gas per mole of blowing agent at a temperature of about 375° F. or less can be used. The amount of such conventional blowing agent will ordinarily be used in an amount up to about 10%, based on weight of elastomeric epihalohydrin polymer employed, and preferably in an amount between about 2% and about 5%, based on polymer weight.

Any ammonium salt which thermally decomposes to release ammonia at temperatures below about 375° F. is effective for accomplishing cross-linking of epihalohydrin polymers for the purposes of this invention. Such ammonium salts may be either salts of organic acids or salts of inorganic acids. Some typical ammonium salts of organic acids include, by way of example, ammonium carbonate, ammonium bicarbonate, ammonium carbamate, ammonium formate, ammonium acetate, ammonium propionate, ammonium citrate, ammonium tartrate, ammonium acid tartrate, ammonium thiocyanate, ammonium cyanate, and the like. Some typical ammonium salts of inorganic acids include, by way of example, ammonium metaantimonate, ammonium arsenate, diammonium monohydrogen arsenate, monoammonium dihydrogen arsenate, ammonium borate, ammonium chloroalladate, ammonium chloroplatinate, ammonium chloroplumbate, ammonium chromate, ammonium dichromate, ammonium dithionate, ammonium fluoride, ammonium iodate, ammonium molybdate, ammonium persulfate, ammonium phosphomolybdate, ammonium selenate, ammonium thiosulfate, etc., and mixtures of such thermally decomposable ammonium salts in any proportion. Obviously, of course, ammonium salts which decompose with explosive violence, such as, for example, ammonium chlorate, ammonium nitrite, ammonium permanganate, ammonium periodate, etc., are not contemplated for the purposes of this invention.

The amount of ammonium salt will depend somewhat on the degree of elasticity desired, as well as on the density desired in the final product, and will be at least sufficient to stabilize the closed-cell structure of the blown product and prevent rupture of the closed-cell structure of the final blown composition. Generally, however, an amount of ammonium salt from about 0.5% to about 10%, and preferably from about 1% to about 5% by weight of the poly(epihalohydrin) may be employed for the purposes of this invention.

This invention contemplates employing any of the numerous host of conventional pigments, fillers, extenders, plasticizers, flame-proofing agents, lubricating and antisticking agents, antioxidants, etc., commonly employed in the art, in any desired combination of such modifying adjuvants, and in any desired proportion thereof, in preparing the expandable, cross-linkable poly(epihalohydrin) compositions and the cross-linked poly(epihalohydrin) cellular products of this invention. However, the presence or absence of such adjuvant is immaterial to the invention.

The general nature of the invention having been set forth, the following examples illustrate some specific embodiments of the invention. It is to be understood, however, that the invention is in no way limited to the examples, since this invention may be carried out by the use of various modifications and changes within the scope of the invention as herein set forth and described. All parts in the following examples are by weight, unless otherwise specified.

Example 1

One hundred (100) parts of an elastomeric homopolymer of epichlorohydrin having a reduced specific viscosity of 1.6, as measured on a 0.1% by weight solution of the elastomer in α-chloronaphthalene at 100° C., was placed on a differential two-roll mill with the front roll maintained at 60° F. with circulating cold water and the back roll maintained at room temperature, and was worked on the mill. Two (2) parts of ammonium carbonate, 1 part of polymerized trimethyl dihydroquinoline, 5 parts of white lead, and 50 parts of fast extrusion furnace carbon black were intimately admixed into the elastomer by working on the mill at the above roll temperatures. The resulting compounded composition was then sheeted from the mill and was allowed to stand overnight prior to curing. This composition had a density of 94 pounds per cubic foot. Mooney scorch measurements were made on this composition at 250° F., in accordance with ASTM D1646.

The sheeted composition was then cut to fit the cavities (1 inch x 2 inches x 0.060 inch) of a multi-cavity compression type aluminum mold, and was pressure cured in the preheated mold for 45 minutes at 310° F. under a pressure of 900 pounds per square inch. The pressure was then released from the mold, and the resulting specimens were well cured, with a uniformly dense structure free of porosity, and having a density of 95.5 pounds per cubic foot. They were strong, highly elastic and substantially odorless. The cured specimens were evaluated at room temperature for modulus at 100% elongation, tensile strength, elongation at break, Shore A2 hardness, and break set. A cured specimen was also subjected to gel-swell measurement by immersion in toluene for 4 hours at 80° C. The following table gives the results of the test data obtained.

Mooney scorch at 250° F. (ASTM D1646), minutes to 5-point rise _____ 20
Modulus at 100% elongation, pounds per square inch _____ 2,120
Tensile strength, pounds per square inch _____ 2,120

| | |
|---|---|
| Elongation at break percent | 100 |
| Shore A2 hardness | 80 |
| Break set, percent | 0 |
| Gel swell (4 hours at 80° C. in toluene): | |
| Weight percent gel | 88 |
| Percent swell | 315 |

*Example 2*

Following substantially the same procedure set forth in Example 1, a composition containing 100 parts of the same elastomeric homopolymer of epichlorohydrin used in Example 1, 50 parts of fast extrusion furnace carbon black, and 2 parts of ammonium carbonate was compounded on the same two-roll mill, and was pressure cured in the same multicavity compression mold employed in Example 1 for 45 minutes at 310° F. under 900 pounds per square inch. The resulting specimens were well cured, with a uniformly dense structure free of porosity, and having a density of 95.5 pounds per cubic foot. Physical property data obtained on the cured specimens follow:

| | |
|---|---|
| Modulus at 200% elongation, pounds per square inch | 1,560 |
| Tensile strength, pounds per square inch | 1,765 |
| Elongation at break, percent | 220 |
| Shore A2 hardness | 70 |
| Break set, percent | 0 |

*Example 3*

Following substantially the same formulating and molding procedure set forth in Example 1, a composition containing 100 parts of the same elastomeric homopolymer of epichlorohydrin used in Example 1, 2 parts of ammonium acetate, 1 part of polymerized trimethyl dihydroquinoline, 5 parts of white lead, and 50 parts of fast extrusion furnace carbon black was compounded on the same two-roll mill, and was pressure cured in the same multi-cavity compression mold employed in Example 1 for 45 minutes at 310° F. under 900 pounds per square inch. The resulting specimens were well cured, with a uniformly dense structure free of porosity, and having a density of 95.5 pounds per cubic foot. Physical property data obtained on the cured specimens follow:

| | |
|---|---|
| Tensile strength, pounds per square inch | 1,520 |
| Elongation at break, percent | 225 |

*Example 4*

One hundred (100) parts of an elastomeric homopolymer of epichlorohydrin having a reduced specific viscosity of 1.6 as measured on a 0.1% by weight solution of the elastomer in α-chloronaphthalene at 100° C., was placed on a differential two-roll mill with the front roll maintained at 60° F. with circulating cold water and the back roll maintained at room temperature, and was worked on the mill. Two (2) parts of ammonium carbonate, 1 part of polymerized trimethyl dihydroquinoline, 5 parts of white lead, and 50 parts of fast extrusion furnace carbon black were intimately admixed into the elastomer by working on the mill at the above roll temperatures. The resulting compounded composition was then sheeted from the mill and was allowed to stand overnight prior to curing. This composition had a density of 94 pounds per cubic foot. Mooney scorch measurements were made on this composition at 250° F. in accordance with ASTM D1646.

The sheeted composition was then cut to fit the cavities (1 inch x 2 inches x 0.060 inch) of a multi-cavity compression type aluminum mold, and was pressure cured in the preheated mold for 3 minutes at 310° F. under a pressure of 900 pounds per square inch. The pressure was then released from the mold, and examination showed that the resulting cross-linked specimens were expanded to approximately twice the thickness of the mold cavity, and were of substantially closed-cell structure. One specimen was subjected to gel-swell measurement by immersion in toluene for 4 hours at 80° C. The remaining specimens were then given a post-cure in an air oven at atmospheric pressure for 20 minutes at 300° F. Examination showed that the resulting post-cured specimens retained both a substantially closed-cell structure and the blown dimensions obtained in the pressure cure, and had a density of 48 pounds per cubic foot. They were strong, highly elastic and substantially odorless. The post-cured specimens were evaluated at room temperature for modulus at 100% elongation, tensile strength, elongation at break, Shore A2 hardness, and break set. A post-cured specimen was also subjected to gel-swell measurement by immersion in toluene for 4 hours at 80° C. The following table gives the results of the test data obtained.

| | |
|---|---|
| Mooney scorch at 250° F. (ASTM D1646), minutes to 5-point rise | 20 |
| Modulus at 100% elongation, pounds per square inch | 240 |
| Tensile strength, pounds per square inch | 495 |
| Elongation at break, percent | 175 |
| Shore A2 hardness | 28 |
| Break set, percent | 0 |
| Gel-swell data (4 hours at 80° C. in toluene), specimen given pressure cure only: | |
| Weight percent gel | 85 |
| Percent swell | 315 |
| Specimen given both pressure cure and post-cure: | |
| Weight percent gel | 88 |
| Percent swell | 315 |

*Example 5*

One hundred (100) parts of an elastomeric copolymer of epichlorohydrin and propylene oxide containing 83% by weight of epichlorohydrin and 17% by weight of propylene oxide, and having a reduced specific viscosity of 12.9, as measured on a 0.1% by weight solution of the elastomer in α-chloronaphthalene at 100° C. was placed on a two-roll mill with the front roll maintained at about 140° F. and the back roll maintained at about 150° F., and allowed to band. Twenty-five (25) parts of fast extrusion furnace carbon black was then incorporated into the elastomer on the mill, followed by the addition of 1.5 parts of a primary amine derived from a tallow fatty acid. An additional 25 parts of fast extrusion furnace carbon black was then incorporated into the elastomer, followed by the addition of 1 part of polymerized trimethyl dihydroquinoline, 5 parts of white lead, and 3 parts of ammonium carbonate, and the above ingredients were intimately admixed with the elastomer by working the composition on the mill at the above roll temperatures. The resulting compounded composition was sheeted from the mill, and was cut into specimens to fit the cavities (1 inch x 2 inches x 0.06 inch) of a multicavity compression type aluminum mold.

A portion of the specimens were pressure cured in the preheated mold for 3 minutes at 310° F. under a pressure of 900 pounds per square inch, whereupon pressure was released from the mold, and examination showed that the specimens were cross-linked and expanded, having a substantially closed-cell structure. These partially cured specimens were then given a post-cure in an air oven at atmospheric pressure for 20 minutes at 300° F. The post-cured specimens had a density of 38.7 pounds per cubic foot, retained a substantially closed-cell structure, and were strong, highly elastic and substantially odorless.

Another portion of the specimens were pressure cured in the preheated mold for 4 minutes at 310° F. under a pressure of 900 pounds per square inch, whereupon pressure was released from the mold, and examination showed that the specimens were cross-linked and expanded, having a substantially closed-cell structure. These partially cured, expanded specimens were then given a post-cure in an air oven at atmospheric pressure for 20 minutes at 300° F. The post-cured specimens had a density of 74.2 pounds per cubic foot, retained a substantially closed-cell structure, and were strong, highly elastic and substantially odorless.

Another portion of the specimens were pressure cured in the preheated mold for 45 minutes at 310° F. under a pressure of 900 pounds per square inch. The pressure was then released from the mold, and the resulting specimens were found to be well cured, having a uniformly dense structure free of porosity, and having a density of 86.8 pounds per cubic foot, and were strong, highly elastic and substantially odorless.

*Example 6*

Following substantially the same procedure set forth in Example 5, a composition containing 100 parts of the same elastomeric homopolymer of epichlorohydrin used in Example 1, 50 parts of fast extrusion furnace carbon black, 1.5 parts of a primary amine derived from a tallow fatty acid, 1 part of polymerized trimethyl dihydroquinoline, 5 parts of white lead, 2 parts of ammonium carbonate, and 5 parts of p,p'-oxy-bis(benzene sulfonyl hydrazide) was compounded on the same two-roll mill. The p,p'-oxy-bis(benzene sulfonyl hydrazide) was the last ingredient incorporated into the composition. The composition after sheeting from the mill was cut into specimens for molding, as set forth in Example 5, and the same molding procedure set forth in Example 5 was followed.

The specimens given the 3 minute pressure cure were cross-linked and expanded, having a substantially closed-cell structure with a density of 36.2 pounds per cubic foot.

The specimens given the 4 minute pressure cure were cross-linked and expanded having a substantially closed-cell structure with a density of 41.8 pounds per cubic foot.

The specimens given the 45 minute pressure cure were well cured, having a uniformly dense structure free of porosity with a density of 95.5 pounds per cubic foot.

All cured specimens were strong, highly elastic and substantially odorless.

*Example 7*

Following substantially the same procedure set forth in Example 6, a composition containing 100 parts of the same elastomeric homopolymer of epichlorohydrin used in Example 1, 50 parts of fast extrusion furnace carbon black, 1.5 parts of a primary amine derived from a tallow fatty acid, 1 part of polymerized trimethyl dihydroquinoline, 5 parts of white lead, 2 parts of ammonium acetate, and 5 parts of p,p'-oxy-bis(benzene sulfonyl hydrazide) was compounded on the same two-roll mill. After sheeting from the mill, the composition was cut into specimens for molding, as set forth in Example 5.

A portion of the specimens were pressure cured in the mold for 4 minutes at 310° F. under a pressure of 900 pounds per square inch, whereupon pressure was released from the mold, and examination showed that the specimens were cross-linked and expanded, having a substantially closed-cell structure. These partially cured, expanded specimens were then given a post-cure in an air oven at atmospheric pressure for 20 minutes at 300° F. The post-cured specimens had a density of 31.2 pounds per cubic foot, retained a substantially closed-cell structure, and were strong, highly elastic and substantially odorless.

Another portion of the specimens were pressure cured in the mold for 6 minutes at 310° F. under a pressure of 900 pounds per square inch, whereupon the pressure was released from the mold, and examination showed that the specimens were cross-linked and expanded, having a substantially closed-cell structure.

These partially cured, expanded specimens were then given a post-cure in an air oven at atmospheric pressure for 20 minutes at 300° F. The post-cured specimens had a density of 40.6 pounds per cubic foot, retained a substantially closed-cell structure, and were strong, highly elastic and substantially odorless.

Another portion of the specimens were pressure cured in the mold for 10 minutes at 310° F. under a pressure of 900 pounds per square inch, whereupon pressure was released from the mold, and examination showed that the specimens were cross-linked and expanded, having a substantially closed-cell structure.

These partially cured, expanded specimens were then given a post-cure in an air oven at atmospheric pressure for 20 minutes at 300° F. The post-cured specimens had a density of 66.8 pounds per cubic foot, retained a substantially closed-cell structure, and were strong, highly elastic and substantially odorless.

Another portion of the specimens were pressure cured in the mold for 45 minutes at 310° F. under a pressure of 900 pounds per square inch. The pressure was then released from the mold, and the resulting specimens were found to be well cured, having a uniformly dense structure free of porosity, and having a density of 95.5 pounds per cubic foot, and were strong, highly elastic and substantially odorless.

*Example 8*

One hundred (100) parts of an essentially completely isotactic (crystalline) homopolymer of epichlorohydrin having a reduced specific viscosity of 5.4, as determined in α-chloronaphthalene at 100° C., was placed on a differential two-roll mill with the front and back rolls maintained at 180° F. Two (2) parts of ammonium acetate, 1 part of polymerized trimethyl dihydroquinoline, 5 parts of white lead, and 5 parts of p,p'-oxy-bis(benzene sulfonyl hydrazide) were intimately admixed into the polymer by working on the mill at the above roll temperatures. The resulting compounded composition was then sheeted from the mill and was allowed to stand overnight prior to curing. The sheeted composition was then cut to fit the cavities (1 inch x 2 inches x 0.06 inch) of a multi-cavity compression type aluminum mold and was pressure cured in the preheated mold for 17 minutes at 310° F. under a pressure of 900 pounds per square inch. The pressure was then released from the mold and examination showed that the resulting cross-linked specimens were expanded to approximately twice the thickness of the mold cavity and were of substantially closed-cell structure. A specimen of the flexible, semi-rigid, cellular material was subjected to gel-swell measurement by immersion in cyclohexanone for 4 hours at 80° C. The material had a percent gel of 91 and a percent swell of 1,431.

It will be apparent from the foregoing description that this invention accomplishes the objectives set forth, and represents an important advance and contribution to the art of expanded materials. The expanded products of this invention are useful in a wide variety of applications such, for example, as resilient "sponge" material for mattresses, pillows, furniture padding, and the like; as packing around delicate apparatus, instruments, and the like to absorb shock during transport, etc.; for thermal insulation or deadening sound; for rigid and semi-rigid foam, etc.

What I claim and desire to protect by Letters Patent is:

1. As a new composition of matter, an expandable, cross-linkable poly(epihalohydrin) composition consisting essentially of a blend of a polymer of epihalohydrin having a weight average molecular weight of at least about 40,000 and from about 0.5% to about 10% by weight of said polymer of an ammonium salt which thermally decomposes at temperatures below about 375° F., and up to about 10% by weight of said polymer of a blowing agent.

2. A composition in accordance with claim 1 in which the ammonium salt is ammonium carbonate.

3. A composition in accordance with claim 1 in which the ammonium salt is ammonium acetate.

4. A composition in accordance with claim 1 in which the polymer of epihalohydrin is a homopolymer of epichlorohydrin.

5. A composition in accordance with claim 1 in which the polymer of epihalohydrin is a copolymer of epichlorohydrin and propylene oxide containing at least about 50% by weight of epichlorohydrin.

6. As a new composition of matter, an expandable, cross-linkable poly(epihalohydrin) composition consisting essentially of a blend of a polymer of epihalohydrin having a weight average molecular weight of at least about 40,000 and from about 0.5% to about 10% by weight of said polymer of an ammonium salt selected from the group consisting of ammonium carbonate, ammonium bicarbonate, ammonium carbamate, and mixtures thereof.

7. A process for cross-linking a polymer of epihalohydrin which comprises heating a mixture consisting essentially of said polymer and from about 0.5% to about 10% by weight of an ammonium salt heat decomposable at a temperature below about 375° F., based on said polymer in a confined space under pressure at a temperature above the decomposition temperature of said ammonium salt.

8. A process for preparing a uniformly dense, cross-linked poly(epihalohydrin)material, substantially free of porosity, which comprises
   (1) blending a mixture consisting essentially of a polymer of an epihalohydrin having a weight average molecular weight of at least about 40,000 and from about 0.5% to about 10% by weight of said polymer of an ammonium salt which thermally decomposes at a temperature below about 375° F. at a temperature below the decomposition temperature of said ammonium salt;
   (2) and heating the resulting blend in a confined space under pressure at a temperature above the decomposition temperature of said ammonium salt until the cross-linking reaction is substantially complete.

9. A process for preparing a cellular polyepihalohydrin) material which comprises
   (1) blending a mixture consisting essentially of an epihalohydrin polymer having a weight average molecular weight of at least about 40,000 and from about 0.5% to about 10% by weight of said polymer of an ammonium salt which thermally decomposes at temperatures below about 375° F., and up to about 10% by weight of said polymer of a blowing agent at a temperature below the decomposition temperature of said ammonium salt and said blowing agent;
   (2) subjecting the resulting blend to a pressure cure of short duration above the decomposition temperature of the ammonium salt and blowing agent to effect blowing and at least partial cross-linking of the polymer;
   (3) thereafter releasing the pressure and subjecting the resulting blown and partially cross-linked polymer to a post-cure at atmospheric pressure to complete cross-linking of said polymer.

10. A process in accordance with claim 9 in which the ammonium salt is ammonium carbonate.

11. A process in accordance with claim 9 in which the ammonium salt is ammonium acetate.

12. A process in accordance with claim 9 in which the polymer of epihalohydrin is a homopolymer of epichlorohydrin.

13. A process in accordance with claim 9 in which the polymer of epihalohydrin is a copolymer of epichlorohydrin and propylene oxide containing at least about 50% by weight of epichlorohydrin.

References Cited by the Examiner
UNITED STATES PATENTS

| | | | |
|---|---|---|---|
| 2,739,134 | 3/1956 | Parry et al. | 260—2.5 |
| 2,831,820 | 4/1958 | Aase et al. | 260—2.5 |
| 3,026,270 | 3/1962 | Robinson | 260—2 |
| 3,026,305 | 3/1962 | Robinson | 260—2 |
| 3,058,921 | 10/1962 | Pannell | 260—2 |
| 3,154,504 | 10/1964 | Carey et al. | 260—2.5 |

MURRAY TILLMAN, *Primary Examiner.*

M. FOELAK, *Assistant Examiner.*